(12) United States Patent
Chen

(10) Patent No.: US 10,262,430 B2
(45) Date of Patent: Apr. 16, 2019

(54) ANNOTATION LINE DETERMINING UNIT, ANNOTATION LINE REMOVING UNIT, MEDICAL DISPLAY, AND METHOD THEREFOR

(71) Applicant: EIZO Corporation, Ishikawa (JP)

(72) Inventor: Haifeng Chen, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 274 days.

(21) Appl. No.: 15/307,508

(22) PCT Filed: Apr. 28, 2014

(86) PCT No.: PCT/JP2014/002361
§ 371 (c)(1),
(2) Date: Oct. 28, 2016

(87) PCT Pub. No.: WO2015/166518
PCT Pub. Date: Nov. 5, 2015

(65) Prior Publication Data
US 2017/0053421 A1 Feb. 23, 2017

(51) Int. Cl.
*G06K 9/00* (2006.01)
*G06K 9/34* (2006.01)
(Continued)

(52) U.S. Cl.
CPC .............. *G06T 7/60* (2013.01); *G06K 9/4604* (2013.01); *G06T 7/0014* (2013.01); *G06T 7/13* (2017.01); *G06T 2207/10024* (2013.01)

(58) Field of Classification Search
None
See application file for complete search history.

(56) References Cited

U.S. PATENT DOCUMENTS

2002/0006231 A1* 1/2002 Jayant ................. G06T 3/403
382/266
2002/0021840 A1 2/2002 Ohara et al.
(Continued)

FOREIGN PATENT DOCUMENTS

| JP | 2002-133426 A | 5/2002 |
| JP | 2012-216184 A | 8/2012 |
| WO | 2013/100053 A1 | 7/2013 |

OTHER PUBLICATIONS

International Search Report dated Jul. 8, 2014 in corresponding Application No. PCT/JP2014/002361; pgs.
(Continued)

*Primary Examiner* — Sean M Conner
(74) *Attorney, Agent, or Firm* — Maier & Maier, PLLC

(57) ABSTRACT

To detect annotation lines in medical image data. Horizontal annotation pixel determination means obtains the color component value difference between each pixel of a predetermined number of connected adjacent pixels in a first direction of the target pixel and an adjacent pixel thereof. If the total number of pixels having color component value differences, of the predetermined number of pixels is equal to or smaller than a first threshold, the horizontal annotation pixel determination means determines that the target pixel is an annotation pixel. If annotation pixels are successive in the horizontal direction in a predetermined number, horizontal annotation line determination means determines that the annotation pixels form an annotation line. The same applies to the vertical direction. The determined annotation lines are provided to border detection means.

7 Claims, 13 Drawing Sheets

(51) Int. Cl.
*G06K 9/48* (2006.01)
*G06T 7/60* (2017.01)
*G06K 9/46* (2006.01)
*G06T 7/00* (2017.01)
*G06T 7/13* (2017.01)

(56) References Cited

U.S. PATENT DOCUMENTS

2005/0031208 A1 2/2005 Ohara et al.
2008/0152230 A1* 6/2008 Forutanpour .......... H04N 5/217
  382/209
2013/0290826 A1* 10/2013 Niwa .................... G06F 19/321
  715/230
2015/0302595 A1* 10/2015 Lee ....................... G06T 7/0075
  382/190

OTHER PUBLICATIONS

Sanjoy Pratihar et al., "Removal of Hand-drawn Annotation Lines from Document Images by Digital-geometric Analysis and Inpainting", 2013 Fourth National Conference on Computer Vision, Pattern Recognition, Image Processing and Graphics (NCVPRIPG), Dec. 18, 2013, pp. 1-4.

* cited by examiner

FIG.6  <HORIZONTAL ANNOTATION LINE DETERMINATION PROCESS>

$$\text{diff\_y}(i,j) = \begin{cases} 1 & \text{if } Y(i,j) \neq Y(i,j-1) \\ 0 & \text{else} \end{cases}$$

$$\text{diff\_u}(i,j) = \begin{cases} 1 & \text{if } U(i,j) \neq U(i,j-1) \\ 0 & \text{else} \end{cases}$$

$$\text{diff\_v}(i,j) = \begin{cases} 1 & \text{if } V(i,j) \neq V(i,j-1) \\ 0 & \text{else} \end{cases}$$

B

$$\text{diff\_uv\_vertical}(i,j) = \begin{cases} 1 & \text{if } U(i-2,j) \neq U(i,j) \ \& \ U(i+2,j) \neq U(i,j) \ \& \\ & V(i-2,j) \neq V(i,j) \ \& \ V(i+2,j) \neq V(i,j) \ \& \\ & U(i,j) \neq 128 \ \& \ V(i,j) \neq 128 \\ 0 & \text{else} \end{cases}$$

C

$$\text{sum\_diff0}(i,j) = \sum_{k=-2}^{2} \text{diff\_u}(i,j+k) + \sum_{k=-2}^{2} \text{diff\_v}(i,j+k)$$

$$\text{sum\_diff1}(i,j) = \sum_{k=-2}^{2} \text{diff\_y}(i-2,j+k)$$

$$\text{sum\_diff2}(i,j) = \sum_{k=-2}^{2} \text{diff\_y}(i+2,j+k)$$

FIG. 9

$$\text{annotation\_pixel}(i,j) = \begin{cases} 1 \text{ if sum\_diff0}(i,j)=0 \text{ \& diff\_uv\_vertical}(i,j)=1 \\ \quad \text{sum\_diff1}(i,j)>\text{th1 \& sum\_diff2}>\text{th1} \\ 0 \text{ else} \end{cases}$$

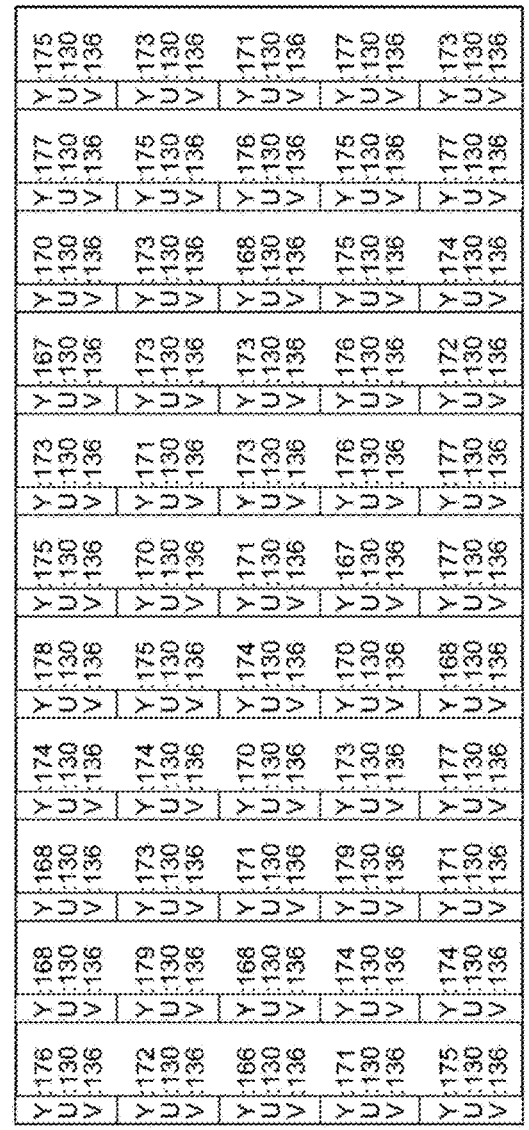
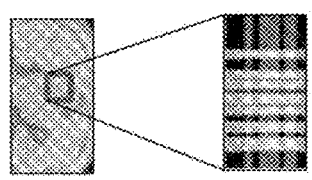
FIG.12

FIG. 13

A $$\text{sum\_diff0}(i,j) = \sum_{k=-2}^{2} \text{diff\_u}(i,j+k) + \sum_{k=-2}^{2} \text{diff\_v}(i,j+k)$$

$$\text{sum\_diff1}(i,j) = \sum_{k=-2}^{2} \text{diff\_y}(i-1,j+k)$$

$$\text{sum\_diff2}(i,j) = \sum_{k=-2}^{2} \text{diff\_y}(i+1,j+k)$$

$$\text{sum\_diff3}(i,j) = \sum_{k=-2}^{2} \text{diff\_y}(i,j+k)$$

B $$\text{annotation\_pixel}(i,j) = \begin{cases} 1: & \text{if sum\_diff0}(i,j)=0, \ \& \ \text{sum\_diff1}(i,j)>th1, \ \& \ \text{sum\_diff2}(i,j)>th1, \ \& \\ & \text{sum\_diff3}(i,j)=0, \ \& \ U(i,j) \neq 128, \ \& \ V(i,j) \neq 128 \\ 0: & \text{else} \end{cases}$$

ANNOTATION LINE DETERMINING UNIT, ANNOTATION LINE REMOVING UNIT, MEDICAL DISPLAY, AND METHOD THEREFOR

TECHNICAL FIELD

The present embodiment relates to a medical display device and, in particular, to the detection of annotation lines.

BACKGROUND ART

Japanese Unexamined Patent Application Publication No. 2012-216184 discloses a medical display device that displays multiple types of images, such as color images and monochrome images, side by side in the form of tiles in such a manner that the borders of the images are adjacent to each other. When displaying images side by side in the form of tiles in this manner, the borders of the images are determined, and a correction process suitable for each image is performed.

SUMMARY OF INVENTION

Technical Problem

A medical doctor may add annotation lines 111 as shown in FIG. 1 to the images on the display device.

In a controller (not shown), such annotation lines are stored in a layer different from that of the original images and therefore can be easily erased. In the display device displaying the images outputted from the controller, on the other hand, the annotation lines are integral with the original images in the image data. For this reason, when the display device attempts to detect these annotation lines, it disadvantageously erroneously detects the annotation lines as the borders of the images and performs inappropriate correction processes on the images.

The present invention has been made to solve the above problem, and an object thereof is to provide an annotation line determination device that reliably determines annotation lines added to medical images.

Solution to Problem (1) An annotation line determination device of the present invention is a device for determining annotation lines added to regions in which medical images are displayed, comprising: annotation pixel determination means configured to obtain color component value differences between each pixel of a predetermined number of connected adjacent pixels in a first direction of a target pixel and an adjacent pixel thereof and, to determine that the target pixel is an annotation pixel if a total number of pixels having color component value differences, of the predetermined number of pixels is a first threshold or less; and annotation line determination means configured to, if the annotation pixel is successive in the first direction in a number equal to or greater than a second threshold, determine that a line formed by the successive annotation pixels is an annotation line.

Thus, the annotation lines added to the medical images can be reliably determined on the display device.

(2) In the annotation line determination device of the present invention, color component values of the pixels are represented by UV values, and if UV values of the target pixel are not gray, the annotation pixel determination means determines that the target pixel is an annotation pixel. Thus, the annotation lines can be more reliably determined using UV values.

(3) In the annotation line determination device of the present invention, a comparison pixel is distant from the target pixel by two pixels or more in a second direction perpendicular to the first direction, and the annotation pixel determination means is further configured to obtain luminance differences between each pixel of the predetermined number of connected adjacent pixels in the first direction of the comparison pixel and an adjacent pixel thereof and, to determine that the target pixel is an annotation pixel if a total number of pixels having luminance differences exceeds a third threshold.

Thus, whether the target pixel is an annotation pixel can be determined with reference to the comparison pixel.

(4) In the annotation line determination device of the present invention, two comparison pixels are present in both the second direction and a direction opposite to the second direction so as to sandwich the target pixel, and the annotation pixel determination means is configured to obtain luminance differences between each pixel of the predetermined number of connected adjacent pixels in the first direction of the two comparison pixels and an adjacent pixel thereof and, to determine that the target pixel is an annotation pixel if a total number of pixels having luminance differences exceeds the third threshold.

Thus, whether the target pixel is an annotation pixel can be determined with reference to the comparison pixels present in both the second direction and the direction opposite thereto.

(5) In the annotation line determination device of the present invention, if the target pixel has a U value and a V value different from a U value and a V value of the comparison pixel, the annotation pixel determination means determines that the target pixel is an annotation pixel. Thus, even an image such as a stripe pattern can be prevented from being erroneously recognized as annotation pixels.

(6) In the annotation line determination device of the present invention, a comparison pixel is adjacent to the target pixel in a second direction perpendicular to the first direction, and the annotation pixel determination means is further configured to obtain Y value differences between each pixel of the predetermined number of connected adjacent pixels in the first direction of the comparison pixel and an adjacent pixel thereof and, to determine that the target pixel is an annotation pixel if there are no Y value differences. Thus, whether annotation pixels form an annotation line can be determined using pixels forming an annotation line.

(7) In the annotation line determination device of the present invention, two comparison pixels are present in both the second direction and a direction opposite to the second direction so as to sandwich the target pixel, and the annotation pixel determination means is further configured to determine that the target pixel is an annotation pixel if there are no luminance differences between each pixel of the predetermined number of connected adjacent pixels in the first direction of the two comparison pixels and an adjacent pixel thereof. Thus, whether the target pixel is an annotation pixel can be determined with reference to the comparison pixels present in both the second direction and the direction opposite thereto.

(8) In the annotation line determination device of the present invention, a plurality of regions are displayed on a screen. Thus, the annotation lines can be extracted from image data in which the medical images are located in the multiple regions.

(11) An annotation line determination method of the present invention is a method for determining annotation lines added to regions in which medical images are displayed, the method comprising: obtaining a color component value difference between each pixel of a predetermined number of connected adjacent pixels in a first direction of a target pixel and an adjacent pixel thereof; and determining that a line formed by the successive pixels is an annotation line if pixels having no color component difference are successive in the first direction in a number equal to or greater than a second threshold. Thus, the annotation lines added to the medical images can be reliably determined on the display device.

(13) A medical image rectangular region border detection device of the present invention is a device for detecting rectangular region borders in which medical images are displayed, comprising: line detection means configured to detect lines from the medical images; removal means configured to detect annotation lines from the detected lines and to remove the annotation lines; and border detection means configured to detect the rectangular region borders from the lines from which the annotation lines have been removed. Thus, the annotation lines added to the medical images can be removed.

(14) In the medical image rectangular region border detection device of the present invention, a line detection algorithm of the removal means differs from a line detection algorithm of the line detection means. Thus, the annotation lines added to the medical images can be reliably removed.

(15) A medical image display device of the present invention is a display device for displaying, on a display unit, rectangular region borders in which medical images are displayed, comprising: line detection means configured to detect lines from the medical images; removal means configured to detect annotation lines from the detected lines and to remove the annotation lines; border detection means configured to detect the rectangular region borders from the lines from which the annotation lines have been removed; and correction means configured to perform a display correction process for each of the regions surrounded by the detected borders. Thus, it is possible to remove, on the display device alone, the annotation lines added to the medical images and to perform an appropriate correction process for each region.

In the present specification, the term "connected adjacent pixels" refer to aligned pixels adjacent to the target pixel directly or through other pixels, as seen in embodiments. While, in the embodiments, "a predetermined number of connected adjacent pixels" are a total of four pixels preceding or following the target pixel, they are not limited thereto.

While, in the embodiments, a "first direction" corresponds to the horizontal direction and a "second direction" corresponds to the vertical direction, these directions may be opposite directions. In the embodiments, a "first threshold" is 0, but it is not limited thereto and includes values that are substantially 0. Also, if noise is present, the "first threshold" may be adjusted to a value such that noise can be removed.

A "second threshold" refers to a threshold for determining whether a line formed by annotation pixels is an annotation line. While, in the embodiments, the second threshold is 10 pixels, it may be other numbers of pixels. A "third threshold" refers to a threshold for determining whether there is a variation in the differences between comparison pixels and adjacent pixels in a first embodiment, and corresponds to th1 in the first embodiment.

Features, other objects, uses, advantageous effects, and the like of the present invention will become apparent from the embodiments with reference to the accompanying drawings.

BRIEF DESCRIPTION OF THE DRAWINGS

FIG. 8 is a calculation formula for calculating a feature value.

FIG. 9 shows criteria for determining whether the target pixel is an annotation pixel.

FIG. 12 is a diagram showing an example in which annotation lines are removed on a special condition.

FIG. 13 is a calculation formula for calculating a feature value in a second embodiment.

DESCRIPTION OF EMBODIMENTS

Now, the embodiments of the present invention will be described with reference to the drawings.

1.1 Function Blocks

Figure 2:
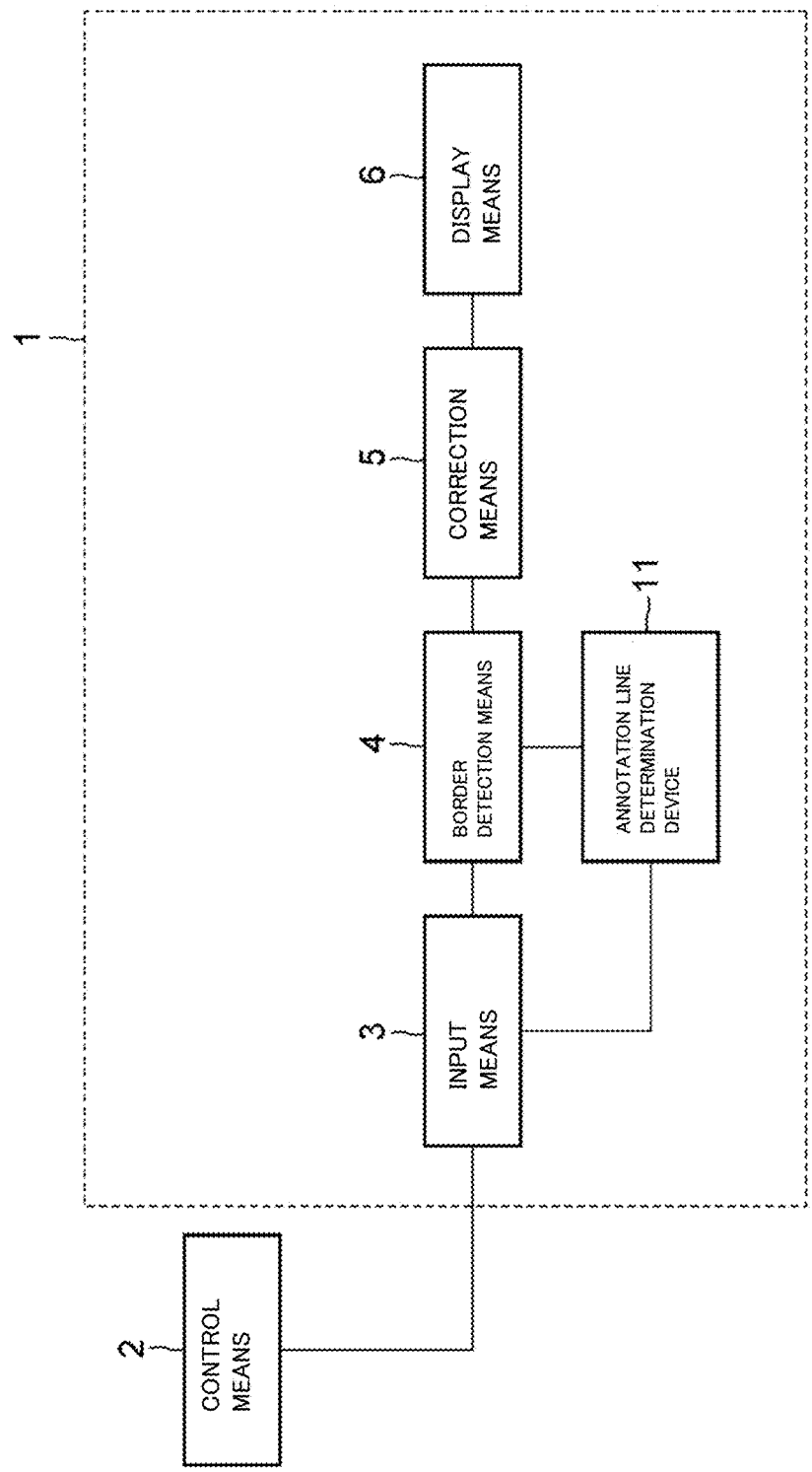
FIG. 2 is a function block diagram of a display device 1.

FIG. 2 shows a function block diagram of a display device 1 including an annotation line determination device 11 of one embodiment of the present invention. The display device 1 includes input means 3, border detection means 4, correction means 5, display means 6, and the annotation line determination device 11.

The input means 3, border detection means 4, correction means 5, and display means 6 operate as do conventional such means. Specifically, when image data (a set of medical screen data located on multiple tiles) provided by control means 2 is inputted to the input means 3, the border detection means 4 detects borders from one frame of image data.

Borders may be extracted using the following means. Borders may be extracted using known conventional means.

That is, there may be used horizontal line detection means that detects, from an input image, lines having horizontal lengths within a predetermined horizontal range, horizontal line set detection means that detects a set of two horizontal lines by searching one horizontal line and another horizontal line closest thereto from the horizontal lines detected by the horizontal line detection means, vertical line detection means that detects, from the input image, lines having vertical lengths within a predetermined vertical range, vertical line set detection means that detects a set of two vertical lines by searching another vertical line closest to one vertical line from vertical lines detected by the vertical line detection means, and particular region detection means that detects, as a particular region, a region surrounded by the set of horizontal lines detected by the horizontal line set detection means and the set of vertical lines detected by the vertical line set detection means.

The horizontal line detection means and vertical line detection means can detect horizontal lines and vertical lines, respectively, by extracting edges using the following means. That is, there may be used edge pixel extraction means that extracts pixels corresponding to edges from the input image, horizontal edge pixel group detection means that detects horizontally successive multiple edge pixels as a group of horizontal edge pixels, and vertical edge pixel group detection means that detects vertically successive multiple edge pixels as a group of vertical edge pixels. The horizontal line detection means detects, as a horizontal line, a group of horizontal edge pixels whose number of successive pixels exceeds a predetermined number. The vertical line detection means detects, as a vertical line, a group of vertical edge pixels whose number of successive pixels falls within a predetermined range.

The correction means 5 performs correction processes on the basis of pixels in each of the regions surrounded by the detected borders. The display means 6 displays the corrected images.

Figure 3:
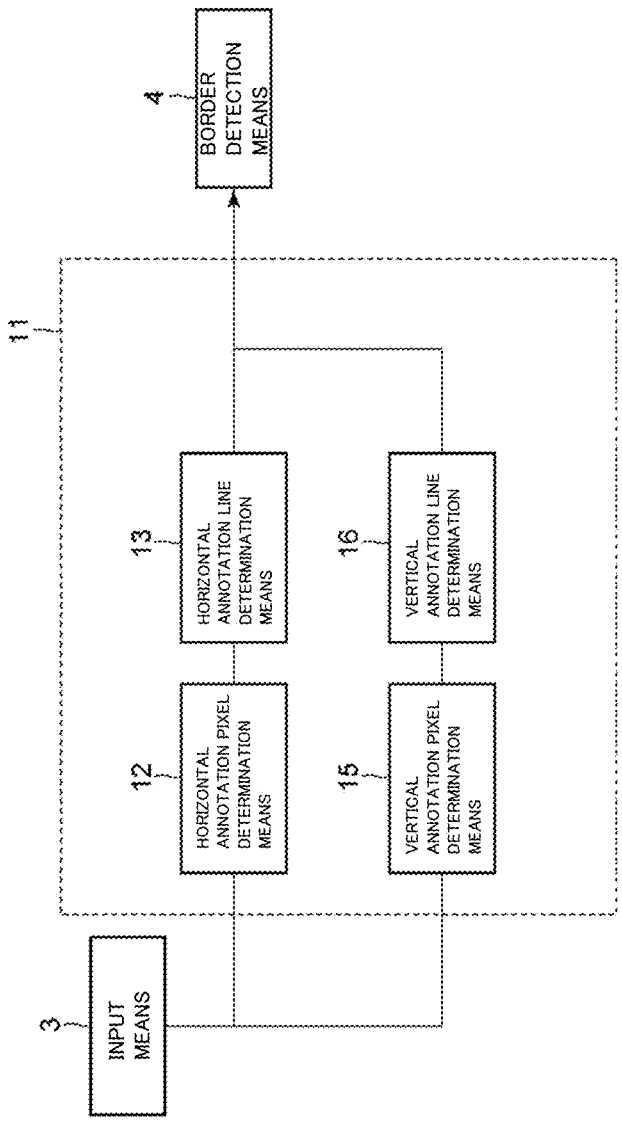
FIG. 3 is a function block diagram of an annotation line extraction device 11.

FIG. 3 shows a detailed block diagram of the annotation line determination device 11. The annotation line determination device 11 is a device that determines annotation lines added to rectangular regions in which medical images are displayed. The annotation line determination device 11 includes horizontal annotation pixel determination means 12, horizontal annotation line determination means 13, vertical annotation pixel determination means 15, and vertical annotation line determination means 16.

The horizontal annotation pixel determination means 12 obtains the color component value differences between each pixel of a predetermined number of connected adjacent pixels in a first direction of the target pixel and an adjacent pixel thereof. If the total number of pixels having color component value differences, of the predetermined number of pixels is equal to or smaller than a first threshold, the horizontal annotation pixel determination means 12 determines that the target pixel is an annotation pixel.

If the annotation pixel is successive in the first direction in a number equal to or greater than a second threshold, the horizontal annotation line determination means 13 determines that a line formed by the successive annotation pixels is an annotation line.

The horizontal annotation pixel determination means 12 also obtains the Y value differences between each pixel of the predetermined number of connected adjacent pixels in the first direction of a comparison pixel and an adjacent pixel thereof. The comparison pixel is distant by two pixels or more in the vertical direction perpendicular to the horizontal direction of the target pixel. The horizontal annotation pixel determination means 12 determines that the target pixel is an annotation pixel if the sum of the Y value differences exceeds a third threshold.

In other example, the horizontal annotation pixel determination means 12 may obtains the Y value differences between each pixel of the predetermined number of connected adjacent pixels in the first direction of a comparison pixel and an adjacent pixel thereof. In this case, the comparison pixels are distant by two pixels or more in the vertical direction perpendicular to the horizontal direction of the target pixel and an adjacent pixel thereof. The horizontal annotation pixel determination means 12 may determine that the target pixel is an annotation pixel only if the sum of the Y value differences exceeds a third threshold.

In another example, the comparison pixels may be present in both the second direction and a direction opposite thereto so as to sandwich the target pixel, and the annotation pixel determination means may obtain luminance differences between each pixel of the predetermined number of connected adjacent pixels in the first direction of the two comparison pixels and an adjacent pixel thereof and, may determine that the target pixel is an annotation pixel if a total number of pixels having luminance differences exceeds a third threshold.

The vertical annotation pixel determination means 15 and vertical annotation line determination means 16 determine vertical annotation pixels and vertical annotation lines, respectively, in manners similar to those of the horizontal annotation pixel determination means 12 and horizontal annotation line determination means 13.

The determined annotation lines are given to the border detection means 4. The border detection means 4 removes the annotation lines from lines from which borders are to be detected, in the image data and then detects borders. Thus, even when annotation lines are present in the image data, an appropriate correction process can be performed for each of the regions surrounded by the detected borders.

1.2 Hardware Configuration

Figure 4:
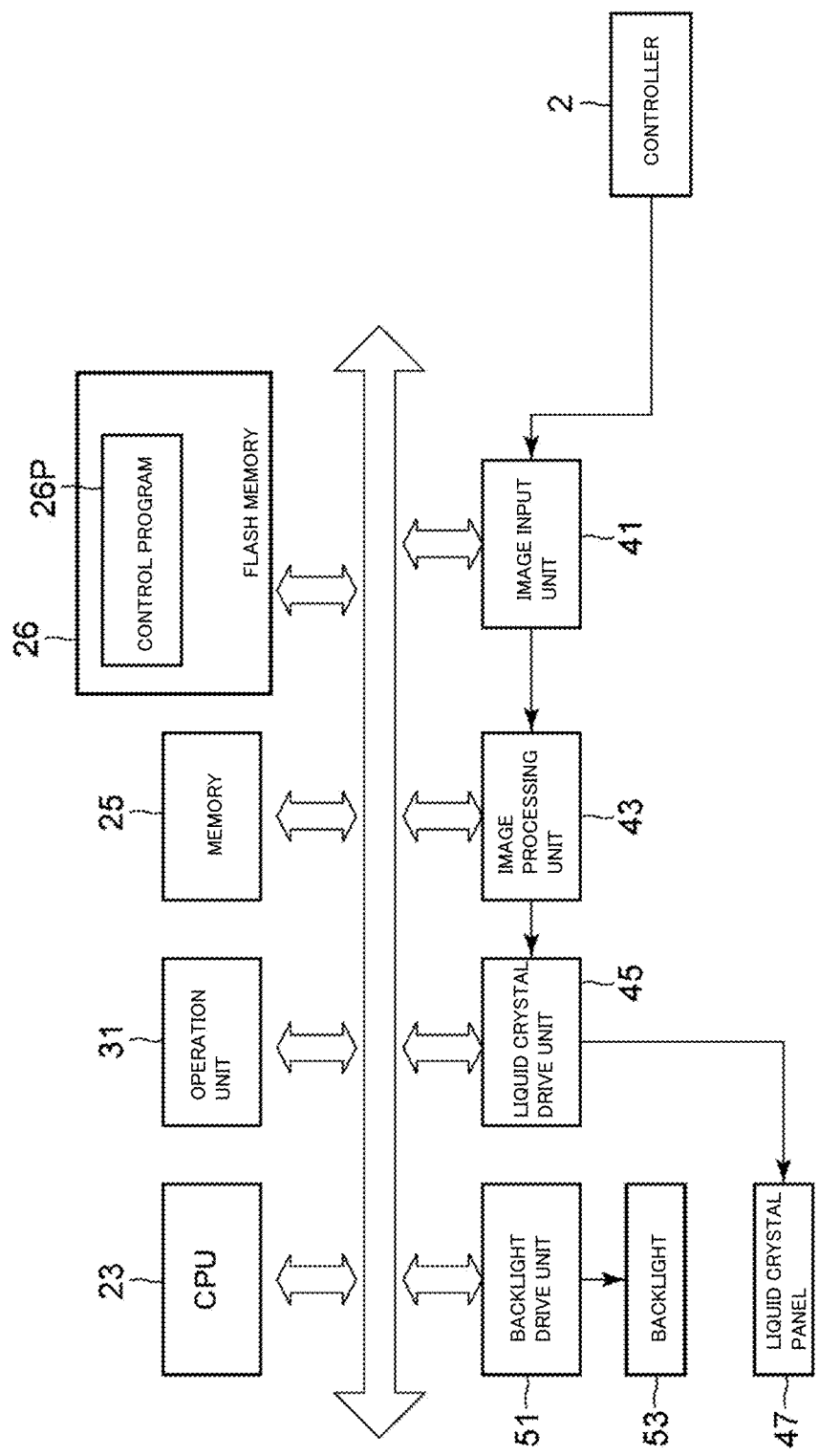
FIG. 4 is a diagram showing an example of hardware configuration using a CPU.

FIG. 4 shows the hardware configuration of the display device 1. The display device 1 includes a CPU 23, a memory 25, an operation unit 31, a flash memory 26, a backlight drive unit 51, a liquid crystal drive unit 45, an image processing unit 43, and an image input unit 41.

The operation unit 31 includes function keys or the like that the user uses to operate the display device 1. The operation unit 31 receives an operation of the user on these function keys and reports it to the CPU 23. The CPU 23 controls the operation of the elements in accordance with the report from the operation unit 31. The backlight 53 is disposed on the back side of the liquid crystal panel 47 in the display device 1 and is driven by an output voltage provided by the backlight drive unit 51. The liquid crystal drive unit 45 outputs a drive signal for driving the liquid crystal panel 47, in accordance with a provided image signal. The pixels of the liquid crystal panel 47 each consist of sub-pixels having multiple colors such as RGB, and colors can be displayed by disposing color films in the light transmission direction.

The image input unit 41 receives image signals from controller 2. The image processing unit 43 performs various types of image processing such as brightness adjustment or color balance adjustment on the image signals and then provides the resulting signals to the liquid crystal drive unit 45. The liquid crystal drive unit 45 drives the liquid crystal panel 47 in accordance with the provided image signals. In this way, the display device 1 displays an image based on the image signals from the controller 2. The image processing unit 43 performs various types of image processing on the image signals (input images) provided from the image input unit 41 under the control of the controller 2 and provides the resulting image signals (output images) to the liquid crystal drive unit 45. The image processing unit 43 also corrects the gradation value of the input image from the image input unit 41 in accordance with a previously stored lookup table (LUT), that is, performs gamma correction. Further, the image processing unit 43 of the display device 1 of the present embodiment detects windows from the input image and corrects each window using an optimum lookup table.

The flash memory 26 stores a control program 26p. The control program 26p receives an annotation line determination and determination result (to be discussed later) and performs an appropriate correction process for each region. The memory 25 stores a calculation result and the like.

The CPU 23 makes the annotation line determination in accordance with the control program 26p and stores the result in the memory 25.

1.3 Description of Flowchart

Figure 5:
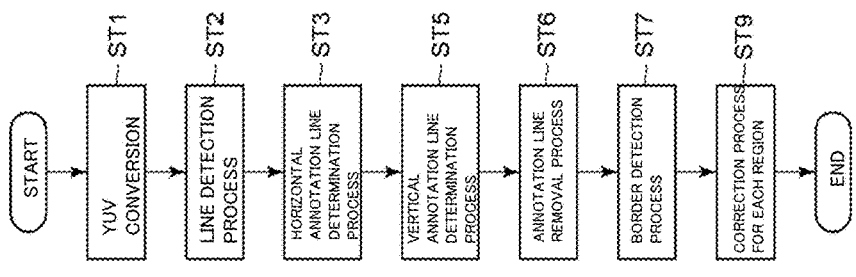
FIG. 5 is a flowchart of an entire display process.

Referring now to FIG. 5, a process performed by the display device 1 will be described. When the CPU 23 receives RGB-format image data from the controller 2, it converts the image data into YUV format (step ST1 in FIG. 5). A well-known technology may be used to acquire YUV data.

Figure 1:
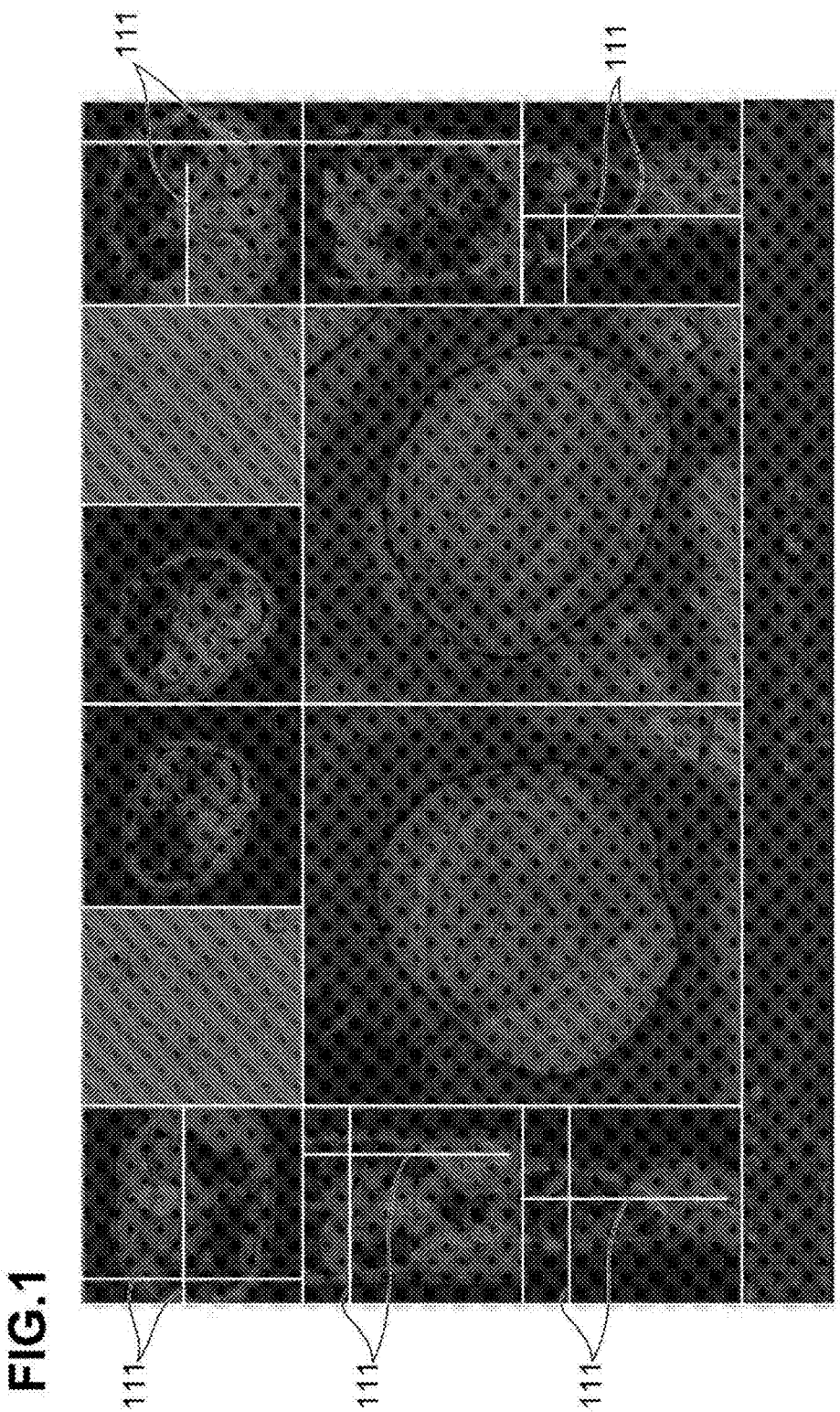
FIG. 1 shows the display screen of a medical display device to which annotation lines are added.

The CPU 23 performs a line detection process (step ST2). The line detection process may also be performed using a well-known technique. For example, in the present embodiment, line detection is performed as follows: a group of horizontally or vertically successive multiple edge pixels is detected from the input image; and if the horizontal or vertical length of the detected group of edge pixels is equal to or greater than a predetermined value, the group of edge pixels is detected as a line. In this case, an annotation line as shown in FIG. 1 is also extracted as a line.

The CPU 23 then performs a horizontal annotation line determination process (step ST3). Details of step ST3 will be described with reference to FIG. 6.

Figure 6:
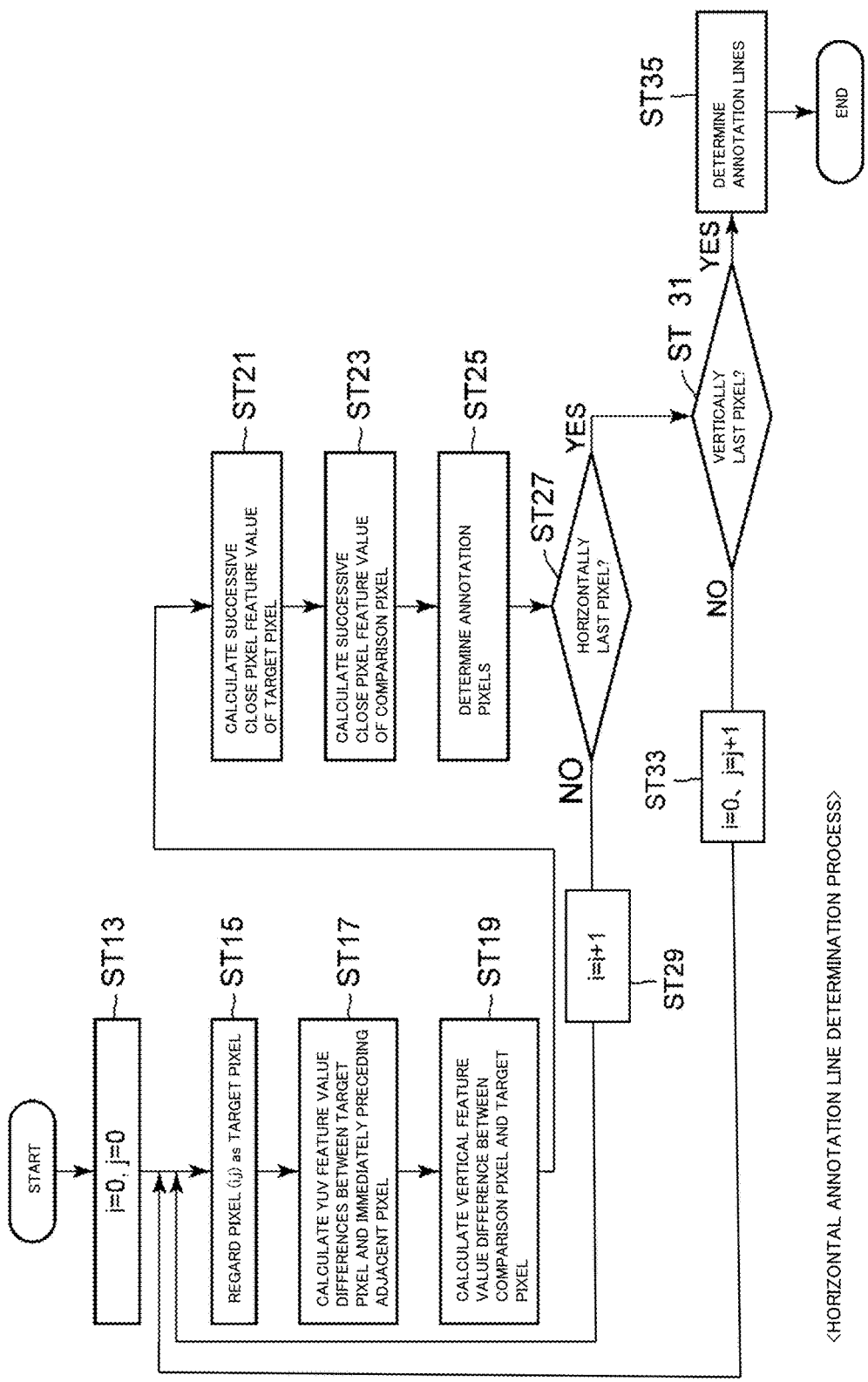
FIG. 6 is a detailed flowchart of a horizontal annotation line determination process.

The CPU 23 initializes the target pixel number (i,j) (step ST13 in FIG. 6). The CPU 23 regards pixel (i,j) as the target pixel (step ST15) and performs annotation line determination processes while shifting the target pixel (steps ST17 to ST29). If it is determined in step ST27 that the current target pixel is the horizontally last pixel, the CPU 23 vertically shifts the target pixel by one pixel and then performs steps ST17 to ST29.

Figure 7:
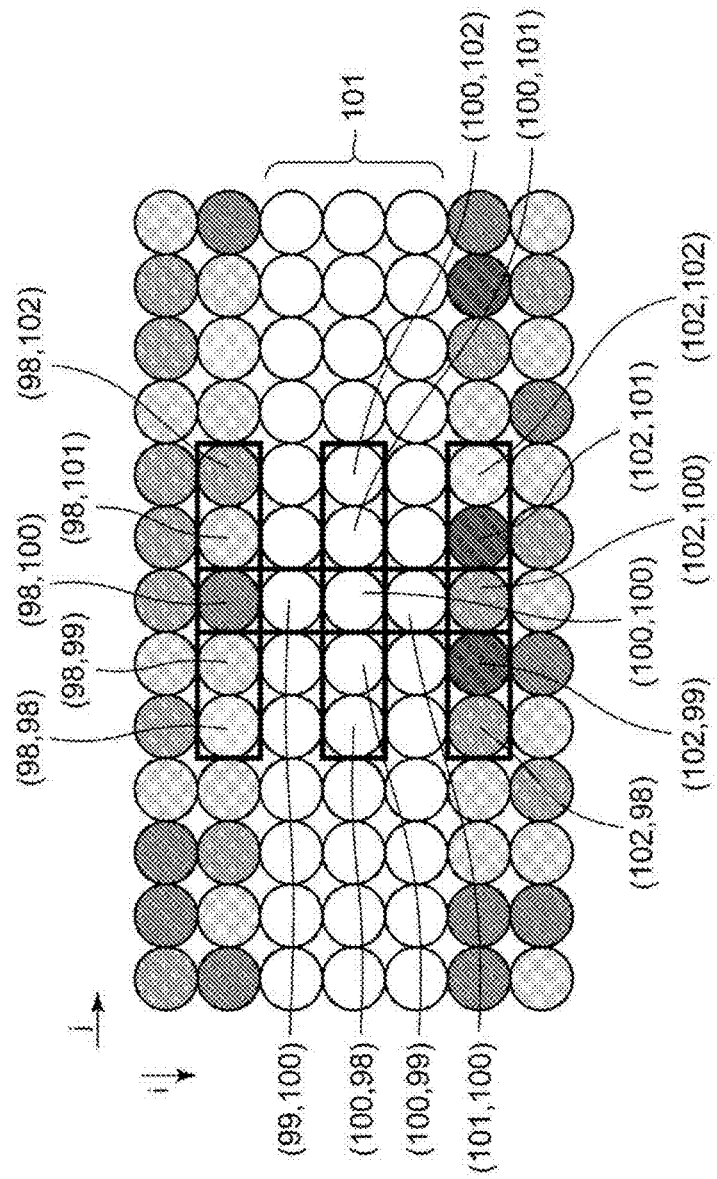
FIG. 7 shows pixels used when extracting a feature value relating to the target pixel.

A case in which pixel (100,100) on an annotation line 101 is the target pixel, as shown in FIG. 7, will be described below.

The CPU 23 calculates YUV feature value differences diff_y(100,100), diff_u(100,100), and diff_v(100,100) between pixel (100,100) serving as the target pixel and pixel (100,99), which is an adjacent pixel horizontally immediately preceding the target pixel (step ST17 in FIG. 6). As seen above, the color component differences between pixels are determined in a direction perpendicular to the direction in typical edge detection.

Specifically, the CPU 23 calculates YUV feature value differences diff_y, diff_u, and diff_v using a formula shown in FIG. 8A. If there is any such difference, it sets the flag to "1"; otherwise, it sets the flag to "0."

The CPU 23 then calculates a vertical feature value difference diff_uv_vertical between the target pixel and each comparison pixel (step ST19 in FIG. 6). In the present embodiment, pixels that are vertically distant from the target pixel by two pixels are defined as first and second comparison pixels. In this case, pixel (98,100) and pixel (102,100) serve as a first comparison pixel and second comparison pixel, respectively, with respect to pixel (100,100) serving as the target pixel.

To make a determination shown in FIG. 8B, the CPU 23 performs the following calculation: first, the CPU 23 calculates the U value difference and V value difference between pixel (100,100) and pixel (98,100); and the CPU 23 also calculates the U value difference and V value difference between pixel (100,100) and pixel (102,100). Thus, the CPU 23 obtains the four differences: the U value difference between the target pixel and first comparison pixel; the V value difference between the target pixel and first comparison pixel; the U value difference between the target pixel and second comparison pixel; and the V value between the target pixel and second comparison pixel. If all the four differences are present and if none of the U value and V value of the target pixel (100,100) is 128, that is, if the target pixel is not gray, the CPU 23 sets the vertical feature value difference diff_uv_vertical to "1"; otherwise, it sets the vertical feature value difference to "0." The meaning of the vertical feature value difference diff_uv_vertical will be described later.

In this case, pixel (98,100) and pixel (100,100) have different UV values and therefore the vertical feature value difference diff_uv_vertical is set to 1.

The CPU 23 then calculates a successive close pixel feature value sum_diff0 of the target pixel (step ST21 in FIG. 6). In the present embodiment, as shown in FIG. 8C, the successive close pixel feature value sum_diff0 is defined as the sum of diff_u and diff_v obtained in step ST17, of pixels (100,98) to (100,102), which are the target pixel and successive close pixels which are horizontally distant from the target pixel by up to two pixels.

The CPU 23 also calculates successive close pixel feature values sum_diff1 and sum_diff2 of the comparison pixels (step ST23 in FIG. 6). In the present embodiment, as shown in FIG. 8C, the successive close pixel feature value sum_diff1 of one comparison pixel is defined as the sum of diff_y obtained in step ST17, of pixels (98,98) to (98,102), which are the one comparison pixel and successive close pixels which are vertically distant from the one comparison pixel by up to two pixels, and the successive close pixel feature value sum_diff2 of the other comparison pixel is defined as the sum of diff_y obtained in step ST17, of pixels (102,98) to (102,102), which are the other comparison pixel and successive close pixels which are horizontally distant from the other comparison pixel by up to two pixels.

The CPU 23 then determines annotation pixels (step ST25 in FIG. 6). In the present embodiment, if the following conditions: the successive close pixel feature value sum_diff0 of the target pixel is 0; the vertical feature value difference diff_uv_vertical is 1; the successive close pixel feature value sum_diff1 of the one comparison pixel is greater than th1; and the successive close pixel feature value sum_diff2 of the other comparison pixel is greater than th1 are all satisfied, as shown in FIG. 9, it determines that the target pixel is an annotation pixel. Since pixel (100,100) satisfies all these conditions, the CPU 23 stores pixel (100, 100) as an annotation pixel in the memory 25 (see FIG. 4).

The CPU 23 then determines whether the current target pixel is the horizontally last pixel (step ST27). Since the current target pixel is not the horizontally last pixel, the CPU 23 increments pixel number i and then repeats steps ST15 and later.

If it determines in step ST27 that the current target pixel is the horizontally last pixel, the CPU 23 determines whether the target pixel is the vertically last pixel (step ST31). If the target pixel is not the vertically last pixel, the CPU 23 initializes pixel number i and increments pixel number j, and then repeats steps ST15 and later.

If, in step ST31, the target pixel is the vertically last pixel, the CPU 23 determines annotation lines (step ST35). In the present embodiment, an annotation line is determined as follows: if the annotation pixels extracted in step ST25 are successive in a predetermined number or more, it determines that the annotation pixels form an annotation line; otherwise, it determines that the annotation pixels do not form an annotation line.

When the horizontal annotation line determination process is complete, the CPU 23 performs a vertical annotation line determination process (step ST5 in FIG. 5). The vertical annotation line determination process is performed by simply changing the horizontal direction in step ST3 to the vertical direction and therefore will not be described.

The CPU 23 removes the annotation lines detected in steps ST3 and ST5 from the lines detected in step ST2. In the present embodiment, in addition to the annotation lines extracted in steps ST3 and ST5, lines within a predetermined width Th3 are removed. For example, assume that Th3 is 3 pixels. For horizontal annotation lines, lines within a width of vertical three pixels are removed; for vertical annotation lines, lines within a width of horizontal three pixels are removed.

The reason is: in the present embodiment, assuming that an annotation line has a width of, for example, three pixels, pixels distant from the target pixel by two pixels in both directions are defined as comparison pixels, and whether the conditions shown in FIG. 8B are satisfied is determined; and therefore only the centered pixel in the width of three pixels is detected as an annotation pixel. For example, if pixel (99,100) in FIG. 7 is the target pixel, there is no difference between the target pixel and pixel (101,100), which a comparison pixel below the target pixel and distant from the target pixel by two pixels. Accordingly, such a target pixel is not determined to be an annotation pixel.

By removing also peripheral lines in this way, annotation lines can be extracted and removed more reliably.

Figure 10:
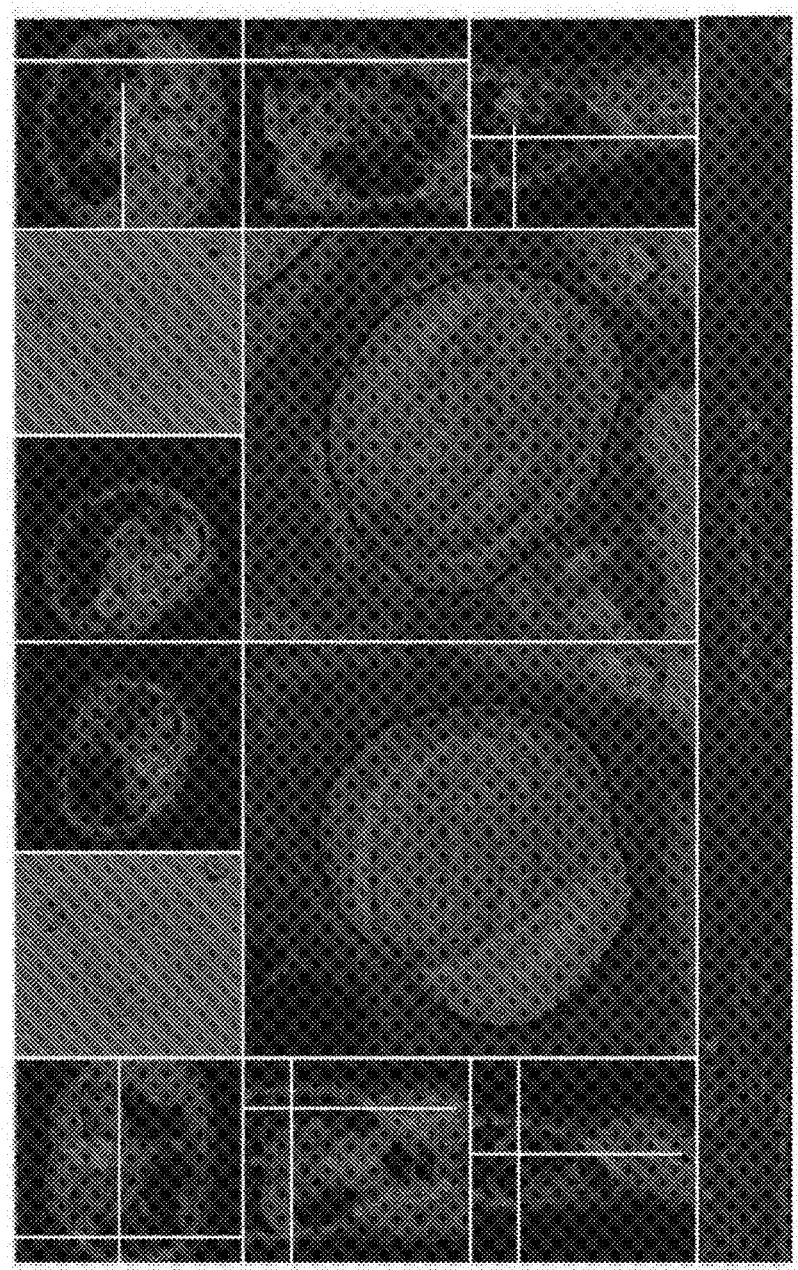
FIG. 10 shows a display screen on which lines including annotation lines are displayed.
Figure 11:
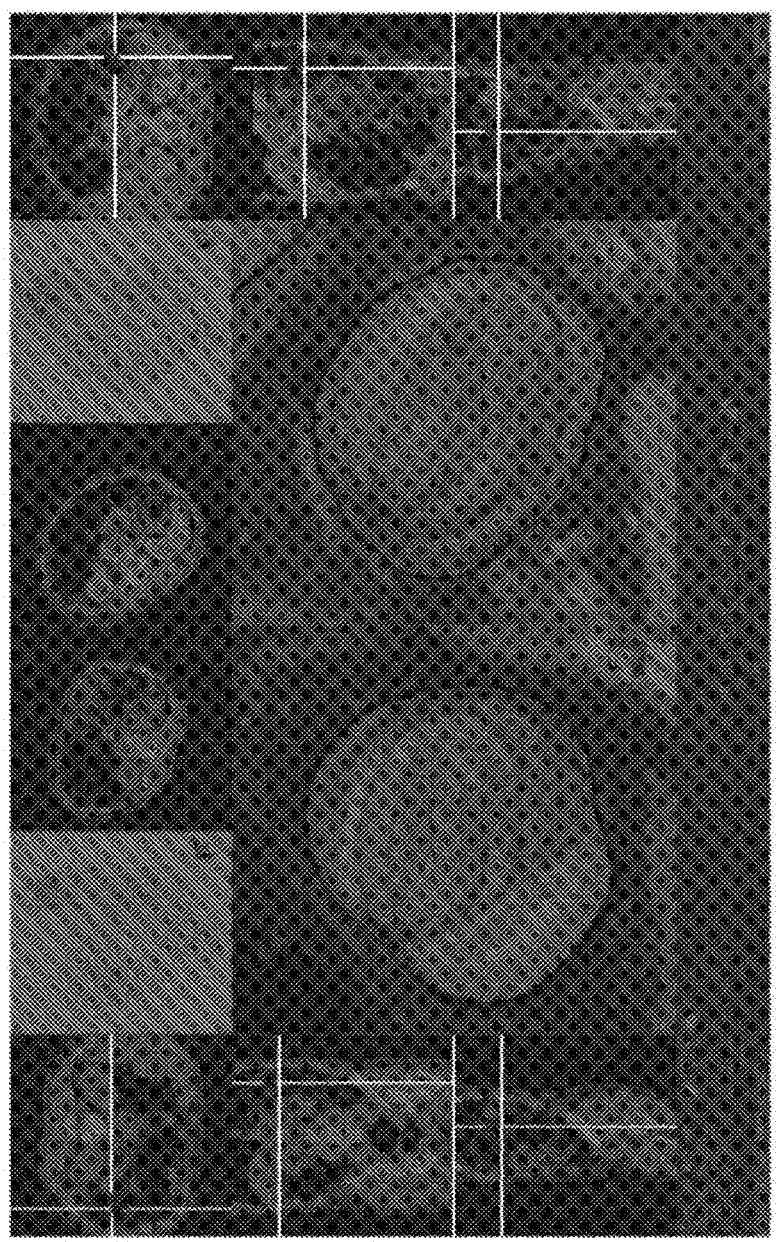
FIG. 11 shows a display screen from which only annotation lines are extracted.

Note that it is optional whether the predetermined width Th3 as described above is set. According to the above steps, annotation lines shown in FIG. 11 can be removed from lines detected in step ST2 in FIG. 5 as shown in FIG. 10.

The CPU then performs a border detection process (step ST7 in FIG. 5). A conventional technique may be used to perform the border detection process. In the present embodiment, a combination of closest lines having the same direction and length is determined to be lines forming a border.

The CPU 23 then performs a correction step for each of the regions surrounded by the detected borders (step ST9 in FIG. 5).

As seen above, even when medical images include annotation lines, borders can be detected from the medical images while removing the annotation lines, allowing an appropriate correction process to be performed for each of the regions surrounded by the detected borders.

The present inventors examined many samples. As a result, in the present embodiment, if the following conditions are satisfied, it is determined that annotation pixels form an annotation line. That is, 1) the thickness of an annotation line has a width of a predetermined number of pixels (e.g., three pixels) or less; 2) an annotation line has one color and is colored, and the color difference components U, V of pixels forming an annotation line have the same values; and 3) while the pixel value varies outside an annotation line within a region parallel with the annotation line, the pixel value does not vary inside the annotation line.

Since the above 1) states that an annotation line has a width of three pixels or less, a comparison pixel is defined as a pixel distant from the target pixel by two pixels. However, the width of an annotation line is not limited thereto. For example, if the width of an annotation line is five pixels or less, a comparison pixel may be defined as a pixel distant from the target pixel by three pixels. Thus, pixels inside the annotation line and pixels outside the annotation line can be reliably compared.

In the present embodiment, if all the four differences: the U value difference between the target pixel and first comparison pixel; the V value difference between the target pixel and first comparison pixel; the U value difference between the target pixel and second comparison pixel; and the V value between the target pixel and second comparison pixel are present as the vertical feature value differences diff_uv_vertical and if any of the U value and V value of the target pixel (100,100) is not 128, the flag of the vertical feature value differences diff_uv_vertical is set to "1"; otherwise, the flag of the vertical feature value differences diff_uv_vertical is set to "0" (see FIG. 8B). An image having vertical and horizontal stripes, as shown in FIG. 12A, becomes a set of pixels whose UV values are all the same and whose Y values alone are different, as shown in FIG. 12B. According to the present invention, it is possible to prevent erroneous determination of an annotation line by determining whether the UV values of the target pixel and comparison pixels are the same. Note that if such an image determination is not required, the flag of the vertical feature value difference diff_uv_vertical may be determined only on the conditions $U(i,j) \neq 128$, $\& V(i,j) \neq 128$ without determining whether the UV values of the target pixel and comparison pixels are the same.

If a predetermined number of successive edge pixels are detected in detecting a border, the edge pixels are detected as a line. In the present embodiment, on the other hand, whether annotation pixels form an annotation line is determined using the relationship between pixels in an annotation line to be determined and pixels outside the annotation line and by criteria different from those in typical line detection.

2. Second Embodiment

In the above embodiment, attention is paid to the fact that the thickness of an annotation line is a predetermined number of pixels or less and that the pixel value varies outside the annotation line but does not vary inside the annotation line, and the vertical feature value difference diff_uv_vertical is determined. On the other hand, instead of comparing the pixels inside the annotation line and the pixels outside the annotation line, a determination may be made on the basis of whether the pixels inside the annotation line have the same tendency in a predetermined width.

In this case, the CPU 23 may be caused to make a determination as follows. That is, pixels vertically adjacent to the target pixel are defined comparison pixels. Specifically, pixel (99,100) and pixel (101,100) serve as comparison pixels with respect to pixel (100,100) serving as the target pixel (see FIG. 7).

Using a formula shown in FIG. 13A, the CPU 23 obtains the successive close pixel feature value sum_diff0=0 of the target pixel and the successive close pixel feature values sum_diff1, sum_diff2 of the comparison pixels, as well as the successive close pixel feature value sum_diff3 about the target pixel.

For example, assuming that pixel (100,100) in FIG. 7 is the target pixel, the successive close pixel feature value sum_diff3 of the target pixel may be obtained by calculating the sum of the Y feature value differences diff_y between pixel (100,98) to pixel (100,102) and adjacent pixels horizontally immediately preceding those pixels.

Whether the target pixel is an annotation pixel may be determined on the basis of whether the following conditions are all satisfied, as shown in FIG. 13B: the successive close pixel feature value sum_diff0 of the target pixel is 0; both of the successive close pixel feature values sum_diff1, sum_diff2 of the comparison pixels are greater than th1; the successive close pixel feature value sum_diff3 about the target pixel is 0; and none of the UV values U(i,j), V(i,j) of the target pixel is 128.

The same applies to the determination of a vertical annotation line.

As seen above, whether the target pixel is an annotation pixel can be determined using the relationship between the pixels inside the annotation line.

3. Other Embodiments

While, in the above embodiments, whether there is no color component difference between pixels is determined using the YUV values, such a determination may be made by using RGB values as they are.

While the above embodiments are applied to the cases in which the borders are rectangular regions, they can also be applied to cases in which the borders are regions other than rectangular regions.

While, in the above embodiments, an algorithm for determining an annotation line is an algorithm different from that in line detection in border detection, it is not limited thereto.

While, in the above embodiments, whether the target pixel is an annotation pixel is determined using comparison pixels, comparison pixels need not necessarily be used.

While, in the above embodiments, the present invention is formed as the display device including the annotation line determination device 11, it may be grasped as the annotation line determination device 11 or an annotation line removal device.

While, in the above embodiments, the present invention is applied to the liquid crystal devices, it can also be applied to display devices using an organic light-emitting diode (OLED) and display devices having other configurations, such as electronic paper.

While, in the above embodiments, the functions shown in FIG. 2 are implemented by the execution of software by the CPU 23, some or all thereof may be implemented by hardware such as a logic circuit. Some of the programs may be executed by an operating system (OS).

While the preferred embodiments of the present invention have been described, the invention is not limited thereto. Changes can be made to the embodiments within the scope of the accompanying claims without departing from the scope and spirit of the present invention.

REFERENCE SIGNS LIST

23 CPU
25 RAM
26 flash memory

The invention claimed is:

1. A device for determining annotation lines added to regions in which medical images are displayed, comprising:
    annotation pixel determination means configured to obtain color component value differences between each pixel of a predetermined number of connected adjacent pixels in a first direction of a target pixel and an adjacent pixel thereof, wherein
        a first comparison pixel is distant from the target pixel by two pixels or more in a second direction perpendicular to the first direction,
        a second comparison pixel is distant from the target pixel by two pixels or more in a direction opposite to the second direction,
        the first comparison pixel and the second comparison pixel sandwich the target pixel, and
    the annotation pixel determination means is further configured
        to obtain first luminance differences between each pixel of the predetermined number of first connected adjacent pixels in the first direction of the first comparison pixel and an adjacent pixel thereof,
        to obtain second luminance differences between each pixel of the predetermined number of second connected adjacent pixels in the first direction of the second comparison pixel and an adjacent pixel thereof, and
        to determine that the target pixel is an annotation pixel if a total number of the connected adjacent pixels having color component value differences is a first threshold or less, a total number of the first connected adjacent pixels having luminance differences exceeds a second threshold, and a total number of the second connected adjacent pixels having luminance differences exceeds the second threshold; and
    annotation line determination means configured to, if the annotation pixel is contiguous with other annotation pixels in the first direction in a number equal to or greater than a third threshold, determine that a line formed by the contiguous annotation pixels is an annotation line.

2. The annotation line determination device of claim 1, wherein color component values of the pixels are represented by UV values, and
    if UV values of the target pixel are not gray, the annotation pixel determination means determines that the target pixel is an annotation pixel.

3. The annotation line determination device of claim 2, wherein if the target pixel has a U value and a V value different from a U value and a V value of the first comparison pixel, the annotation pixel determination means determines that the target pixel is an annotation pixel.

4. The annotation line determination device of claim 1, wherein a plurality of regions are displayed on a screen.

5. The annotation line determination device of claim 1, further comprising an annotation line removal means configured to remove the determined annotation line.

6. The annotation line determination device of claim 5, further comprising a display device.

7. A method for determining annotation lines added to regions in which medical images are displayed, the method comprising:
    obtaining a color component value difference between each pixel of a predetermined number of connected adjacent pixels in a first direction of a target pixel and an adjacent pixel thereof, wherein
        a first comparison pixel is distant from the target pixel by two pixels or more in a second direction perpendicular to the first direction,
        a second comparison pixel is distant from the target pixel by two pixels or more in a direction opposite to the second direction, and
        the first comparison pixel and the second comparison pixel sandwich the target pixel;
    obtaining first luminance differences between each pixel of the predetermined number of first connected adjacent pixels in the first direction of the first comparison pixel and an adjacent pixel thereof, obtaining second luminance differences between each pixel of the predetermined number of second connected adjacent pixels in the first direction of the second comparison pixel and an adjacent pixel thereof;

determining that the target pixel is an annotation pixel if a total number of the connected adjacent pixels having color component differences is a first threshold or less, a total number of the first connected adjacent pixels having luminance differences exceeds a second threshold and a total number of the second connected adjacent pixels having luminance differences exceeds the second threshold; and if the annotation pixel is contiguous with other annotation pixels in the first direction in a number equal to or greater than a third threshold, determining that a line formed by the contiguous annotation pixels is an annotation line.

* * * * *